Patented Apr. 27, 1954

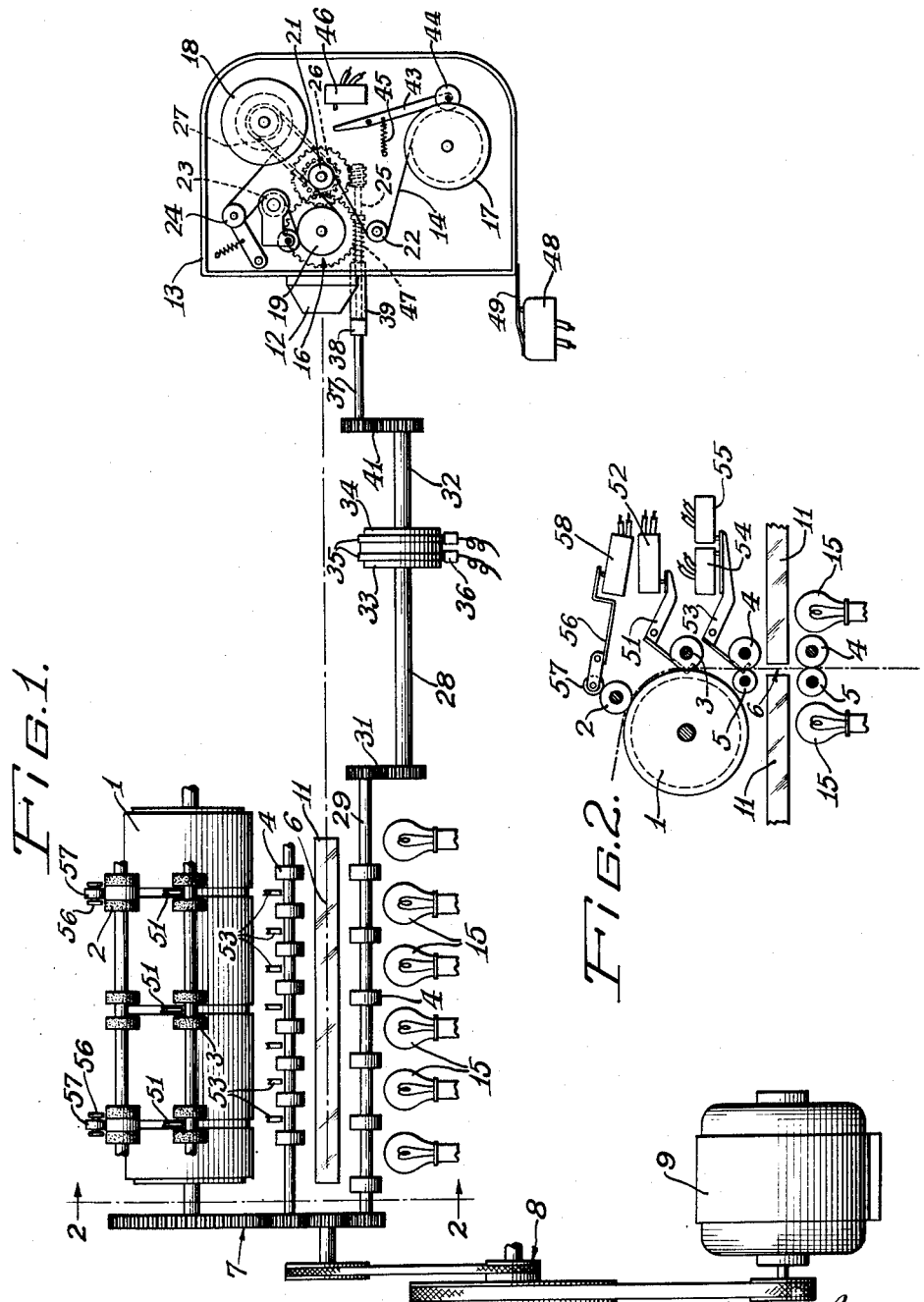

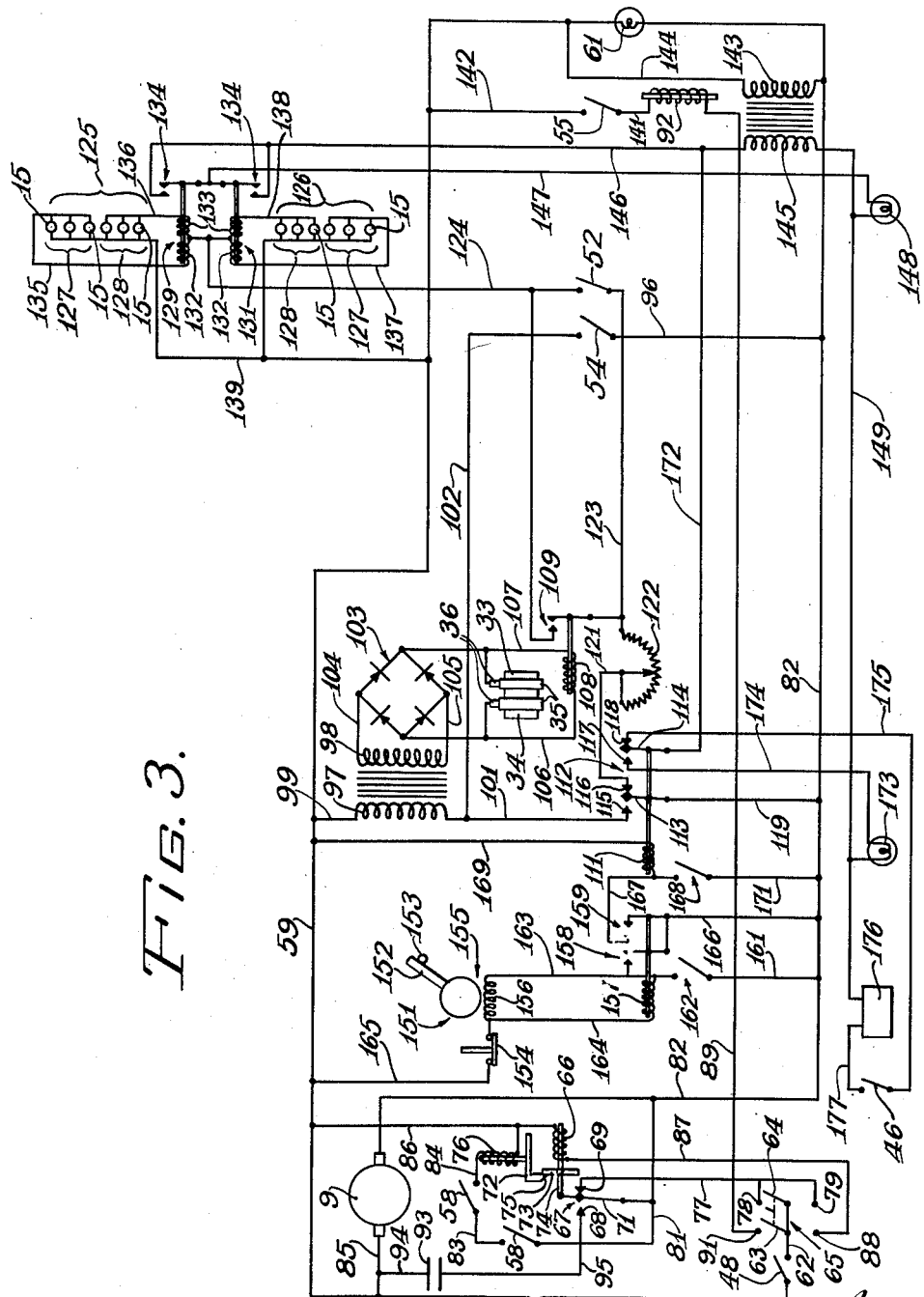

2,676,513

UNITED STATES PATENT OFFICE 2,676,513

CONTROL FOR PHOTOGRAPHIC COPYING APPARATUS

Sverre J. Engstrom, Chicago, Ill., assignor to Bell & Howell Company, Chicago, Ill., a corporation of Illinois Application July 2, 1949, Serial No. 102,854

18 Claims. (Cl. 88—24)

1

The present invention relates particularly to the control of micro-recording apparatus in which sheets or documents are fed in succession and in a continuous manner through the photographic field of a camera, and a sensitized strip in the camera is fed under the control of the fed sheets in a continuous manner through the exposure field of the camera in synchronism with the fed sheets during the photographing operation.

Objects of the invention reside in the provision of a novel, effective and reliable control for photographic copying apparatus which promotes the efficiency and convenience of operation of the apparatus, which provides an efficient and reliable control, by sheets as they are fed through the apparatus, of the feeding of a sensitized strip on which the sheets are photographed and of the illumination of the sheets as they are photographed, which provides for reliably and preferably quickly causing stoppage of the apparatus in the event that superposed sheets are fed into the sheet feeding means of the apparatus, which provides for conveniently removing sheets from the apparatus after it has been stopped by superposed sheets, which provides for stopping operation of the sheet counter of the apparatus while the sheets are being removed from the apparatus after stoppage thereof by superposed sheets, which provides for conveniently and with a minimum of attention on the part of the operator, operating the sensitized strip feeding means of the camera of the apparatus to wind the usual leader portion of the sensitized strip in the camera from the feed reel onto the take up reel of the strip feeding means preparatory to exposure of the strip and to wind the usual trailer portion of the strip from the feed reel onto the take up reel after exposure of the strip preparatory to removal of the strip from the camera for developing the strip, which provides for conveniently feeding the sensitized strip to provide space on the strip between portions thereof on which sheets are photographed, which provides for cutting off of the sheet illuminating means of the apparatus when the apparatus is stopped by superposed sheets, while sheets are being removed from the apparatus after stoppage thereof by superposed sheets, while leader and trailing portions of the sensitized strip are wound onto the take up reel of the strip feeding means, and while the sensitized strip is fed to provide space on the strip between portions thereof on which sheets are photographed, and which provides for indicating failure of the illuminating means to provide the required amount of photographic

2 light for the purpose of stopping operation of the apparatus in such event.

The invention will be better understood by reference to the accompanying drawing forming a part hereof and in which—

Figure 1 is a schematic view in side elevation showing various elements of a photographic copying apparatus in the form of a micro-recorder;

Figure 2 is a sectional view taken substantially on the line 2—2 of Figure 1; and Figure 3 is a wiring diagram of the control of my invention.

Referring to Figures 1 and 2 of the drawing, a horizontal rotatable feed drum 1 receives sequentially fed sheets or documents, and rotatable pressure rollers 2 and 3 are yieldably urged into pressure engagement with the feed drum, and the sheets or documents, as they are fed to the feed drum, are engaged between the feed drum and pressure rollers 2 and 3 and are fed downwardly by the feed drum as it is rotated.

A pair of vertically spaced horizontal rotatable feed rollers 4 are arranged below the feed drum 1 in parallelism therewith and rotatable pressure rollers 5 are yieldably urged into pressure engagement respectively with the feed rollers 4. Sheets fed edgewise downwardly from the feed drum 1 engage between the pairs of rollers 4 and 5 and are vertically and downwardly fed edgewise through a photographic field 6 between the pairs of rollers 4 and 5, this photographic field being that of the camera of the apparatus, hereinafter described. The sheet path is indicated by the dot and dash line in Figure 2. The feed drum 1 and the feed rollers 4 are driven in timed relation by gearing, generally designated at 7 in Figure 1, which is driven through a belt and pulley transmission 8 from an electric motor 9.

A pair of opposed converging reflectors 11 are arranged in a horizontal plane and transversely of the vertical sheet path and obliquely to and on opposite sides of the photographic field 6 for reflecting images of opposite faces of the fed sheets as they pass the photographic field to the objective 12 of a photographic camera 13 for the photographing of opposite faces of the fed sheets on a sensitive film or strip 14 in the camera. Two horizontal banks of incandescent electric lamps 15 are arranged respectively on opposite sides of the vertical sheet path in parallelism therewith and immediately below the photographic field 6 and reflectors 11 for illuminating opposite faces of the fed sheets at the photographic field for the photographing of said opposite faces.

The camera 13 is of the flow type and is provided therein with strip feeding means for feeding the sensitized strip 14 in the camera through the exposure field 16 of the camera at the rear or the camera objective 12, and, see Figure 1, the strip feeding means comprises as follows:

Vertically spaced feed and take up reels 17 and 18 are rotatably mounted in the camera in the usual manner providing for installation of the reels in and removal thereof from the camera. A rotatably mounted exposure drum 19 of relatively large diameter is disposed to the rear of the objective 12 and supports the sensitized strip 14 at the exposure field 16 of the camera. A rotatably mounted idler roller 21 is disposed to the rear of the exposure drum 19, a rotatably mounted idler roller 22 is disposed below the exposure drum, and two vertically spaced rotatably mounted idler rollers 23 and 24 are disposed above the exposure drum.

The sensitized strip 14 extends from a roll of the strip on the lower or feed reel 17 about the roller 22, then in an opposite manner about the roller 21, then in an opposite manner about the exposure drum 19, then in an opposite manner about the roller 23, then in an opposite manner about the roller 24, and finally to a roll of the sensitized strip on the upper or take up reel 18 on which the strip is wound as it is exposed.

A shaft 25 is rotatably mounted on the camera 13 in parallelism with the focal axis of the camera and the exposure drum 19 is driven from this shaft through gearing generally designated at 26, and the take up reel 18 is driven from the gearing 26 by a yielding belt and pulley drive 27 to take up the sensitized strip as it is fed by rotation of the exposure drum 19.

A rotatably mounted shaft 28 is disposed in parallelism with the shaft 29 of the lower sheet feed roller 4, and is driven therefrom by gearing 31, so that the shaft 28 is driven from the motor 9. A rotatably mounted shaft 32 is alined with the shaft 28 and is selectively driven therefrom by an electromagnetic clutch comprising a solenoid clutch element 33 secured on the shaft 28 and a clutch element 34 of magnetic material secured on the shaft 32 and attracted into frictional engagement with the clutch element 33 when the latter is energized, the clutch element 33 being energized through slip rings 35 thereon and brushes 36 respectively contacting the slip rings.

A rotatable shaft 37 is alined with the camera drive shaft 25, and is connected with the camera shaft to drive the same by a normally engaged clutch comprising toothed clutch elements 38 and 39 respectively secured on these shafts. The shaft 37 is driven from the shaft 32 by gearing 41, so that assuming the electromagnetic clutch 33—34 to be engaged, the sensitized strip feeding mechanism is driven from the motor 9 in timed relation with the sheet feeding mechanism which is also driven from the motor, the sheet feeding mechanism comprising the feed drum 1 and the rollers 4 driven from the motor and the pressure rollers 2, 3 and 5. When the sheets, fed by the sheet feeding mechanism, are being photographed on the sensitized strip 14, the electromagnetic clutch is engaged so that the sensitized strip in the camera is fed in timed relation with the sheets as they pass through the photographic field 6 and in the direction opposite that in which the sheets are fed, and when sheets are not being fed, the electromagnetic clutch is normally disengaged so that the sheet feeding mechanism may be driven by the motor in readiness to feed sheets without necessitating feeding the sensitized strip in the camera, the electromagnetic clutch being automatically controlled in this respect as hereinafter described.

A lever 43 is pivotally mounted within the camera and one end of this lever is provided with a roller 44 which is engaged against the roll of the sensitized strip 14 on the feed reel 17 by a spring 45, and when this roll approaches a minimum diameter, the spring causes the lever to close a normally open film supply switch 46 in the camera to energize a signal circuit, as hereinafter described, for indicating to the operator that the unexposed portion of the sensitized strip in the camera is nearing exhaustion.

The camera is detachably mounted on the apparatus and is installed on and removed from the apparatus respectively with downward and upward movement of the camera in a manner unnecessary to be described, and to permit such movement the camera, the drive clutch element 39 is slidably keyed on the shaft 25 and is yieldably urged outwardly of the camera to engage the clutch element 38 by a spring 47 reacting on this shaft, the clutch element 39 being manually retracted to clear the clutch element 38 during installation and removal of the camera.

A normally open camera controlled switch 48 is mounted on the apparatus and is provided with an actuating arm 49 which is engaged by the camera when the camera is mounted on the apparatus to close this switch and which is disengaged from the camera when the camera is removed from the apparatus to open this switch.

A pivotally mounted switch arm 51 is yieldably urged into a normal position in which one end thereof in the form of spaced fingers projects across the path of the fed sheets as they are fed toward the photographic field 6, and a fed sheet engages this arm and moves and maintains it out of the sheet path while the switch arm is under the control of the sheet. A light control switch 52, under the control of the switch arm 51, is yieldably urged into open position and remains open when the switch arm is in its normal position and is closed by the switch arm when the switch arm is positioned under the control of a fed sheet.

A pivotally mounted switch arm 53 is yieldably urged into a normal position in which one end thereof in the form of spaced fingers projects across the path of the fed sheets as they are fed toward the photographic field 6, and a fed sheet engages this arm and moves and maintains it out of the sheet path while this switch arm is under the control of the sheet. Clutch and light control and sheet counter control switches 54 and 55, under the control of the switch arm 53, are yieldably urged into open position and remain open when the switch arm 53 is in its normal position and are closed by this switch arm when this switch arm is positioned under the control of a fed sheet. The switch arm 53 is disposed closer to the photographic field 6 than the switch arm 51 and the switch arms are spaced a distance lineally of the sheet path less than the corresponding dimension of the fed sheets, so that the switches 54 and 55 are under the control of a fed sheet in following overlapping relation with the control of the switch 52 by the sheet for a purpose hereinafter appearing.

Inasmuch as the pressure roller 2 is yieldably urged into pressure engagement with the feed drum 1, the passage of a sheet therebetween displaces the pressure roller radially of the feed drum and the passage of superposed sheets therebetween displaces the pressure roller to a greater extent. A pair of pivotally mounted switch arms 56 are disposed respectively adjacent the ends of the pressure roller 2, and are provided with rollers 57 which respectively engage the end portions of the pressure roller in diametrically opposite relation with the feed drum 1. The switch arms 56 are yieldably urged in the direction to engage the rollers 57 against the pressure rollers 2, so that the switch arms 56 are actuated with displacement of the pressure roller 2 to an extent corresponding with the sheet thickness between the pressure roller 2 and the feed drum 1. A pair of normally open superposed sheet detector switches 58, respectively under the control of the switch arms 56, remain open when the switch arms 56 are in normal position or when they are actuated by a single sheet fed between the pressure roller 2 and the feed drum 1. However, when superposed sheets are fed between the pressure roller 2 and the feed drum 1, the pressure roller is displaced and the switch arms 56 are actuated to a sufficient extent to close both detector switches 58 for stopping the sheet feeding means in a manner hereinafter described. While one double sheet detector switch may be employed, it is preferable to employ two of them respectively in the regions of the sides of the sheet path to obtain a more reliable superposed sheet detection and to prevent the detection of a sheet which is folded at one portion or one which has an identifying tag attached to one portion thereof.

Referring to Figure 3, lead wires 59 and 60 are supplied from a suitable source of alternating electrical current, preferably through a constant voltage transformer not shown, and the lead wire 59 is connected to one terminal of an incandescent electric lamp 61 which serves to illuminate the sheet receiving hopper, not shown, of the apparatus and incidentally to indicate energization of the motor 9 as will hereinafter appear. The lead wire 60 is connected to one terminal of the camera switch 48 which is closed when the camera 13 is mounted on the apparatus for photographing the fed sheets. The other terminal of the camera switch is connected by a wire 62 to both switch arms 63 and 64 of a manually controlled main double pole double throw switch 65.

An electromagnetic relay comprises a relay coil 66 and a single pole double throw switch 67 under the control of this relay coil and comprising two stationary contacts 68 and 69 and a switch arm 71 yieldably urged into contact with the contact 68. Energization of the relay coil 66 places the switch arm in contact with the contact 69, and a latch 72 engages in front of a shoulder member 73 on the armature 74 of the relay to maintain the switch arm 71 in contact with the contact 69 when the relay coil 66 is de-energized, the latch being yieldably urged into latching position and provided with a cam face 75 for latching the switch arm 71 in contact with the contact 69 as the relay coil 66 places the switch arm in such contact. A solenoid 76 serves when energized to actuate the latch 72 out of engagement with the shoulder member 73 to permit the switch arm to move under its yieldable urge into contact with the contact 68.

A branch wire 77 connects the contact 69 with both stationary contacts 78 and 79 of one pole of the switch 65. A branch wire 81 connects one terminal of one detector switch 58 with the switch arm 71 and with another wire 82. The other terminal of the said detector switch 58 is connected with one terminal of the other detector switch 58 by a wire 83, and wire 84 connects the other terminal of said other detector switch 58 with one terminal of the solenoid 76. The wire 82 is connected with one terminal of the driving motor 9 and with the other terminal of the lamp 61, and a wire 85 connects the other terminal of the motor 9 with the lead wire 59, a branch wire 85 connects the line wire 59 with the other terminal of the solenoid 76 and with one terminal of the relay coil 66, and a wire 87 connects the other terminal of the relay coil 66 with the stationary contact 88 of the other pole of the switch 65. A wire 89 connects the stationary contact 91 of said other pole of the switch 65 with one terminal of a sheet counter operating solenoid 92.

A braking condenser 93 has one terminal thereof connected by a wire 94 with the wire 85 and consequently with one terminal of the motor 9, and the other terminal of the condenser is connected by a wire 95 with the contact 68 of the switch 67.

A wire 96 connects the wire 82 with one terminal of the clutch and light control switch 54, and a step down transformer, comprising a primary 97 and a secondary 98, has one terminal of the primary thereof connected with the lead wire 59 by a wire 99 and has the other terminal of the primary thereof connected with a wire 101 which in turn is connected with the other terminal of the clutch and light control switch 54 by a wire 102. The terminals of the secondary 98 of this transformer are respectively connected to the input terminals of a full wave rectifier 103 by wires 104 and 105, and the output terminals of the rectifier are respectively connected by branch wires 106 and 107 with the brushes 36 of the solenoid clutch element 33 and with the terminals of a relay coil 108 which together with a single pole single throw relay switch 109 under the control of this relay coil comprises an electromagnetic relay, the relay switch 109 being yieldably urged into open position and constituting a second light control switch.

An electromagnetic relay comprises a relay coil 111 and a double pole double throw switch 112 under the control of this relay coil and consisting of two switch arms 113 and 114, stationary contacts 115 and 116 alternately contacted by the switch arm 113 and stationary contacts 117 and 118 alternately connected by the switch arm 114, these switch arms being yieldably urged to respectively contact the contacts 116 and 118.

The wire 101 is connected to the contact 115, and a wire 119 connects the switch arm 113 with the wire 82. A wire 121 connects the contact 116 with one terminal of a light intensity control rheostat 122, and a branch wire 123 connects the other terminal of this rheostat with one terminal of the relay switch 109 and with one terminal of the light control switch 52. A branch wire 124 controls the other terminals of the light control switch 52 and the light control relay switch 109 in circuit with the illuminating lamps 15 of the apparatus in a manner now to be described.

The illuminating lamps 15 are arranged, as before described, in two horizontal banks respectively on opposite sides of the vertical sheet path for illuminating opposite sides of the sheets as they are fed through the photographic field 6, these banks being designated respectively at 125 and 126 in Figure 3. Each bank of lamps comprises two lamp units 127 and 128 and each unit has an equal number of lamps. Each of two electromagnetic differential relays 129 and 131 comprises two relay coils 132 and 133 and a relay switch 134 under the differential control of said relay coils and yieldably urged into open position.

The wire 124 is connected with one pair of terminals of opposite polarity relation of the differential relay coils 132 and 133 of each differential relay. The other pair of terminals of opposite polarity relation of the relay coils 132 and 133 of the differential relay 129 are respectively connected with one terminal of the lamps 15 of the lamp units 127 and 128 of the lamp bank 125 by wires 135 and 136, and the other pair of terminals of opposite polarity relation of the relay coils 132 and 133 of the other differential relay 131 are respectively connected with one terminal of the lamps 15 of the lamp units 127 and 128 of the other lamp bank 126 by wires 137 and 138. The other terminals of all the lamps 15 are connected to the lead wire 59 by a branch wire 139.

Recalling that the wire 89 connects the contact 91 of the switch 65 with one terminal of the sheet counter operating solenoid 92, the other terminal of this solenoid is connected by a wire 141 with one terminal of the sheet counter control switch 55, and the other terminal of the switch 55 is connected by a wire 142 with the lead wire 59.

Assuming the camera to be mounted on the apparatus and the switch 48 to be consequently closed, and the switch arm 71 of the relay switch 67 to be held in contact with the contact 69 by the latch 72, the main control switch 65 is closed in photographing position in which the switch arms 63 and 64 respectively contact the contacts 91 and 78, to energize the motor 9 through lead wire 60, switch 48, wire 62, switch arm 64, contact 78, wire 77, contact 69, switch arm 71, wire 81, wire 82, wire 85 and lead wire 59, energization of the motor causing the sheet feeding means to be driven thereby. The wire 82 being thus connected with the lead wire 60 the lamp 61 is energized by reason of its terminals being respectively connected with the wire 82 and the lead wire 59 to indicate that the driving motor 9 is energized.

The circuit of the lamps 15 also includes the wire 82 connected to the lead wire 60 through the switches 48, 65 and 67, when closed as aforesaid, so that the lamp circuit is also controlled by each of these switches, and the lamp circuit further comprises wire 119, switch arm 113 normally contacting contact 116 of switch 112, wire 121, rheostat 122, wire 123, either light control switch 52 or 109, wire 124, differential relay coils 132 and 133, wires 135, 136, 137 and 138, lamps 15, wire 139 and lead wire 59, the switches 52 and 109 being arranged in parallel relation so that closure of either of these switches energizes the lamps.

The circuit of the primary 97 of the transformer 97—98 also includes the wire 82 connected to the lead wire 60 through the switches 48, 65 and 67, when closed as aforesaid, so that this transformer primary circuit and the circuit of the secondary 98 of this transformer, which includes the solenoid clutch element 33 and the relay coil 108, are controlled by each of these switches, and the circuit of the transformer primary 97 further comprises wire 96, clutch and light control switch 54, wire 102, wire 101, transformer primary 97, wire 99 and lead wire 59.

The circuit of the sheet counter actuating solenoid 92, comprises lead wire 60, switch 48, wire 62, switch arm 63 and contact 91 of switch 65, wire 89, sheet counter actuating solenoid 92, wire 141, sheet counter solenoid control switch 55, wire 142, and lead wire 59, it being observed that the sheet counter solenoid switch 55 cannot actuate the sheet counter actuating solenoid unless the switch 48 is closed and the main control switch 65 is closed in photographing position as above described.

Assuming the motor 9 to be energized and driving the sheet feeding means, each sheet as it is fed by the sheet feeding means toward the photographic field 6 engages the switch arm 51 and actuates it to close the light control switch 52 and thus energize the lamps while this switch is under the control of the fed sheet, the fed sheet closing the light control switch a short time before the sheet reaches the photographic field 6 so that the lamps 15 reach maximum brilliance before the sheet enters the photographic field.

As the fed sheet approaches closer to the photographic field after it has closed the switch 52 and immediately before it enters the photographic field, the fed sheet engages the switch arm 53 and actuates it to close the clutch and light control switch 54 and the sheet counter control switch 55. Closure of the clutch and light control switch 54 energizes the solenoid clutch member 33 to engage the clutch 33—34 and drive the sensitized strip feeding means from the motor 9 for feeding the sensitized strip 14 for photographing the sheet as it passes through the photographic field 6 and energizes the relay coil 108 to close the switch 109 and energize the lamps 15 through the switch 109 while the switch 54 is closed under the control of the fed sheet. The switch arm 53 being disposed closer to the photographic field 6 than the switch arm 51 and the switch arms being spaced a distance lineally of the sheet path less than the corresponding dimension of the fed sheets and the switch 54 being thus under the control of a fed sheet in following overlapping relation with the control of the switch 52, the lamps 15 are maintained energized while either or both of the switches 52 and 54 are closed under the control of the fed sheet, so that the lamps are brought up to maximum brilliance before a fed sheet reaches the photographic field and are maintained energized during the photographing of the sheet and after the control of the switch 52 by the sheet terminates. Closure of the counter control switch 55 under the control of a fed sheet energizes the sheet counter operating solenoid 92 for actuating a usual counter not shown for counting the number of sheets photographed.

As before described, the sheets as they are fed by the sheet feeding means pass between the feed drum 1 and the pressure roller 2 and displace the pressure roller 2 radially of the feed drum and correspondingly actuate the switch arm 56 to an extent corresponding with the sheet thickness between the pressure roller and the feed drum, and when superposed sheets are fed between the pressure roller and feed drum, the switch arm is actuated sufficiently to close the double document detector switches 58. Closure of these switches energizes the solenoid 76 and releases the latch 72 from the shoulder member 73 with the result that the switch arm 71 of the switch 67 moves under its yieldable urge out of contact with the contact 69 and into contact with the contact 68. Disengagement of the switch arm 71 from the contact 69 opens the circuit between the lead wire 60 and the wire 81 so that the circuit of the motor 9 as well as the other circuits of the apparatus under the control of the switch arm 71 and contact 69 including that of the lamp 61 are opened. The motor 9 being deenergized the sheet feeding means comes to a stop, and stoppage of the motor and sheet feeding means is desirably effected quickly by reason of the switch arm 71 contacting the contact 68 and connecting the braking condenser 83 across the terminals of the motor 9 through wire 85, wire 94, wire 95, contact 68, switch arm 71, wire 81 and wire 82.

After the apparatus has been stopped by closure of the double document detector switches 58, it is necessary to reset the switch arm 71 in contact with the contact 69, and this is accomplished by momentarily positioning the main control switch 65 in resetting position in which the switch arms 63 and 64 respectively contact the contacts 88 and 79. With the switch main control switch 65 in resetting position the solenoid 66 is energized through wire 60, switch 48, wire 62, switch arm 63, contact 88, wire 87, wire 86, and lead wire 59, to contact the switch arm 71 with the contact 69 whereupon the latch 72 engages in front of the shoulder member 73 to retain the switch arm 71 in contact with the contact 69. The switch arm 64 being in contact with the contact 79 when the main control switch 65 is in resetting position and thus connecting this switch arm with the contact 69 through the wire 77, the motor 9 is energized to drive the sheet feeding mechanism when the switch arm 71 is reset into contact with the contact 69, so that removal of the sheets in the sheet feeding mechanism when the sheet feeding mechanism was stopped, is effected when the main control switch 65 is in resetting position. After the main control switch has been positioned in resetting position to reset the double document detecting means and the sheets in the sheet feeding mechanism have been removed, the main control switch is again positioned in photographing position in which the motor 9 is energized by the switch arm 64 contacting the contact 78 to drive the sheet feeding means for photographing.

In the photographing position of the main control switch, the switch arm 63 is in contact with the contact 91 for the energization of the sheet counter operating solenoid 92 under the control of the sheet controlled counter control switch 55 for counting the sheets as they are photographed. However, when the main control switch is in resetting position, the switch arm 63 is not in contact with the contact 91 so that the sheets in the sheet feeding means are not counted as they pass through the sheet feeding means for the removal thereof.

The primary 143 of a step down transformer has one terminal connected with the wire 82 and has its other terminal connected by a wire 144 with the lead wire 59 so that it is energized when the switch 48 is closed, the switch arm 71 is in contact with the contact 69 of the switch 67 and the main control switch 65 is in photographing position. One terminal of the secondary 145 of this transformer is connected by a branch wire 146 with one terminal of each of the differential relay switches 134, and the other terminal of each of these switches is connected by a branch wire 147 with one terminal of a signal lamp 148. The other terminal of the lamp 148 is connected by a wire 149 to the other terminal of the transformer secondary 145, so that the differential relay switches are connected in parallel in the circuit of the lamp 148 and closure of either energizes the lamp.

Recalling that the illuminating lamp circuit comprises the wire 124 connected with one pair of terminals of opposite polarity relation of the differential relay coils 132 and 133 of each of the differential relays 129 and 131, that the other pair of terminals of opposite polarity relation of the relay coils of the differential relay coils 132 and 133 of the differential relay 129 are respectively connected with one terminal of the lamps 15 of the lamp units 127 and 128 of the lamp bank 125 by wires 135 and 136 and that the other pair of terminals of opposite polarity relation of the relay coils 132 and 133 of the differential relay 131 are respectively connected with one terminal of the lamps 15 of the lamp units 127 and 128 of the lamp bank 126 by wires 137 and 138, the failure of a lamp of one of the lamp units 127 or 128 of either of the lamp banks 125 or 126 will cause magnetic imbalance of the related differential relay coils 132 and 133 and resulting closure of the related relay switch 134 and consequent energization of the signal lamp 148 to signal the operator of such lamp failure so that he can stop the apparatus and replace a lamp which has failed before photographing further.

An interval timer of usual construction is schematically shown at 151 in Figure 3, and comprises a pivotally mounted switch arm 152 yieldably urged to one end of its movement against a stop 153, a timer switch 154 yieldably urged into closed position and adapted to be opened by the switch arm 152 when this switch arm is moved to the other end of its movement, and an electric timer motor 155 including a motor coil 156 for operating the switch arm at a governed velocity, to said other end of its movement to open the timer switch when the timer motor coil is energized, the governed velocity of the switch arm as operated by the motor providing the timing interval of the timer and the switch arm 152 returning to the first mentioned end of its movement under its yieldable urge when the timer motor is deenergized preparatory to another timing cycle of the timer.

An electromagnetic relay comprises a relay coil 157 and two switches 158 and 159 under the control of this relay coil and yieldably urged into open position. A wire 161 connects the wire 82 with one terminal of a manually controlled cycle switch 162 which is yieldably urged into open position, and a branch wire 163 connects the other terminal of the switch 162 with one terminal of the relay coil 157, with one terminal of the timer motor coil 156, and with one terminal of the relay switch 158. A branch wire 164 connects the other terminals of the relay coil 157 and timer motor coil 156 with one terminal of the timer switch 154, and a wire 165 connects the other terminal of the timer motor switch 154 with the lead wire 59. A branch wire 166 connects the wire 82 with the other terminal of the relay switch 158 and with one terminal of the relay switch 159, and a wire 167 connects the other terminal of the relay switch 159 with one terminal of the relay coil 111 and one terminal of a manually controlled space switch 168 which is yieldably urged into open position. A wire 169 connects the other terminal of the relay coil 111 with the lead wire 59, and a wire 171 connects the other terminal of the switch 168 with the wire 82.

The interval timer 151 serves, in cooperation with the switch 162, the relay 157—158—159 and the relay 111—112, for conveniently and with a minimum attention on the part of the operator, driving the sensitized strip feeding means from the motor 9 independently of the sheet controlled switch 54 to wind the usual leader and trailer portions of the sensitized strip 14 in the camera 13 from the feed reel 17 onto the take up reel 18 and then to automatically stop operation of the strip feeding means. This requires only that the operator momentarily close the cycle switch 162.

Assuming the wire 82 to be connected with the lead wire 6 through the switches 48, 65 and 67, closure of the cycle switch 162 energizes the relay coil 157 and timer motor coil 156 through wire 82, wire 161, switch 162, wire 163, wire 164, closed timer switch 154, wire 165, and lead wire 59, with the result that the timer motor 155 actuates the timer switch arm 152 at governed velocity toward the timer switch 154 and that the relay coil 157 closes the relay switches 158 and 159. Closure of the switch 158 energizes the relay coil 157 and the timer motor coil 156 in that it connects the wire 82 with the wire 158 through the wire 166, so that as soon as the switch 158 is closed the operator can release the cycle switch 162 to open and pay no further attention to the leader or trailer portion winding operation. Energization of the timer motor coil 156 and of the relay coil 157 being continued by the closure of the relay switch 158, the timer motor continues to actuate the switch arm toward the timer switch 154.

The relay switch 159 is also closed with energization of the relay coil 157 and closure of this switch energizes the relay coil 111 from wire 82 and lead wire 59 through wire 166, switch 159, wire 167, and wire 169. Energization of the relay coil 111 causes the relay switch arms 113 and 114 to move out of contact respectively with the contacts 116 and 118 and into contact respectively with the contacts 115 and 117.

As a result of the switch arm 113 being in contact with the contact 115, the primary 97 of the transformer 97—98 is energized from wire 82 and lead wire 59 through wire 119, switch arm 113, contact 115, wire 101, and wire 99, and the resulting current induced in the secondary 98 of this transformer causes energization of the solenoid clutch element 33 and of the relay coil 108 through wires 104 and 105, rectifier 103 and wires 106 and 107. Consequently, the clutch 33—34 is engaged to drive the sensitized strip feeding means from the motor 9, and energization of the relay coil 108 causes closure of the light control relay switch 109. However, closure of the relay switch 109 by contact of the switch arm 113 with the contact 115 does not cause energization of the illuminating lamps 15 for the reason that the switch arm 113 and contact 116 are in series with the switch 109 and the switch arm 113 is out of contact with the contact 116 when it is in contact with the contact 115.

Engagement of the clutch 33—34 and maintenance of the illuminating lamps 15 in deenergized condition is continued during the timing interval of the timer 151 to fully wind the leader or trailer portion of the sensitized strip in the camera onto the take up reel 18 and until the timer switch arm 152, driven at a governed velocity by the timer motor, opens the timer switch 154 and thus deenergizes the timer motor coil 156 and the relay coil 157, whereupon the switch arm 152 returns under its yieldable urge to its normal position against the stop 153 and permits the timer switch 154 to again close, and the deenergization of the relay coil 157 permits the switches 158 and 159 to open before the timer switch closes.

Opening of the relay switch 158 maintains the timer motor coil 156 and relay coil 157 deenergized after the timer switch 154 is closed and until the switch 162 is again closed. Opening of the relay switch 159 deenergizes the relay coil 111 and thus permits the switch arms 113 and 114 to move out of contact respectively with the contacts 115 and 117 and to again respectively contact the contacts 116 and 118. Movement of the switch arm 113 out of contact with the contact 115 deenergizes the primary 97 of the transformer 97—98 and thus deenergizes the solenoid clutch element 33 and relay coil 108 to disengage the clutch 33—34 and open the light control switch 109 so that the clutch 33—34 is again under the control of the sheet controlled clutch and light control switch 54 and the energization of the illuminating lamps 15 are again under the control of the sheet controlled light control switch 52 and the control switch 54 for normal operation of the apparatus for photographing sheets.

The space switch 168 serves, in cooperation with the relay 111—112, for driving the sensitized strip feeding means from the motor 9 independently of the sheet controlled switch 54 to feed the sensitized strip 14 in the camera for the purpose of spacing portions of the sensitized strip upon which sheets are photographed and thus separating the photographs of different groups of sheets on the sensitized strip.

The space switch 168 is connected in series with the relay coil 111 and in parallel with the relay switch 159, and assuming the wire 82 to be connected with the lead wire 60 through the switches 48, 65 and 67, closure of the switch 168 energizes the relay coil 111 through wire 82, wire 171, wire 167, wire 169 and lead wire 59. Energization of the relay coil 111 by closure of the switch 168 effects drive of the sensitized strip feeding means in the same manner and through the same instrumentalities, above described and therefore unnecessary to be repeated, as does energization of the relay coil 111 by the relay switch 159. However, the switch 168 being under direct manual control the interval during which the strip feeding means is driven by closure of this switch and consequently the amount of the sensitized strip which is fed is at the will of the operator.

The switch arm 114 of the relay switch 112 is connected with the wire 146 by a wire 172, the contact 117 of this switch is connected with one terminal of a cycle and space signal lamp 173 by a wire 174, and the other terminal of this lamp is connected to the wire 149. The contact 118 of the relay switch 112 is connected to one terminal of the film supply switch 46 by a wire 175, and the other terminal of the switch 46 is connected to one terminal of an electromagnetic buzzer 176 by a wire 177, and the other terminal of the buzzer is connected to the wire 149.

Recalling that the switch arm 114 of the relay switch 112 is yieldably urged into contact with the contact 118 and is moved out of contact with the contact 118 and into contact with the contact 117 when the relay coil 111 is energized to drive the sensitized strip feeding means independently of the sheet controlled switch 54, when the apparatus is in normal condition for photographing the sheets fed through the sheet feeding means, closure of the switch 46, by the roll of the sensitized strip 14 on the feed reel 17 reaching a minimum diameter, causes the buzzer to be energized from the secondary 145 of the transformer 143—145 through wire 146, wire 172, switch arm 114, contact 118, wire 175, switch 46, wire 177, and wire 149, thus indicating that the sensitized strip is nearing complete exposure and that replacement thereof is required, and when the apparatus is operating to wind the leader or trailer portion of the sensitized strip onto the take up reel 18 of the camera or the sensitized strip is being driven for the purpose of spacing portions of the strip upon which sheets are photographed, contacting of the switch arm 114 with the contact 117 causes the lamp 173 to be energized from the secondary 145 of the transformer 143—145 through wire 146, wire 172, switch arm 114, contact 117, wire 174, and wire 149, thus indicating that the apparatus is operating to wind the leader or trailer portion of the sensitized strip or for the purpose of spacing as above described.

While I have thus described my invention, I do not wish to be limited to the precise details described, as changes may be readily made without departing from the spirit of my invention, but having thus described my invention, I claim as new and desire to secure by Letters Patent the following:

1. In a photographic apparatus, the combination of a camera comprising strip feeding means for feeding a sensitized strip through the exposure field of said camera, sheet feeding means for successively feeding sheets through the photographic field of said camera, electrically energizable illuminating means for illuminating said sheets at said photographic field, driving means for driving said sheet feeding means, an electromagnetic clutch for driving said strip feeding means from said driving means, a first switch under the control of a sheet as it is fed toward said photographic field for energizing said illuminating means while under said control, electromagnetic means for energizing said illuminating means independently of control of said first switch by said sheet, a second switch under the control of said sheet in following overlapping relation with said control of said first switch as said sheet is fed toward said photographic field for engaging said clutch and causing said electromagnetic means to energize said illuminating means while said second switch is under control of said sheet.

2. In a photographic apparatus, the combination of a camera including strip feeding means for feeding a sensitized strip through the exposure field of said camera, sheet feeding means for successively feeding sheets through the photographic field of said camera, electrically energizable illuminating means for illuminating said sheets at said photographic field, driving means for driving said sheet feeding means, an electromagnetic clutch for driving said strip feeding means from said driving means, a normally open first switch connected in series with said illuminating means and under the control of a sheet as it is fed toward said photographic field to be closed while under said control, an electromagnetic relay comprising a normally open relay switch and a relay coil adapted when energized to close said relay switch, said relay switch being connected in series with said illuminating means independently of said first switch, and a normally open third switch connected in controlling relation with said clutch and relay coil for energizing and deenergizing the same respectively with closing and opening thereof and said third switch being under the control of said sheet in following overlapping relation with said control of said first switch as said sheet is fed toward said photographic field to be closed while under control of said sheet.

3. In a photographic apparatus, the combination of a camera including strip feeding means for feeding a sensitized strip through the exposure field of said camera, sheet feeding means for successively feeding sheets through the photographic field of said camera, electrically energizable illuminating means for illuminating said sheets at said photographic field, driving means for driving said sheet feeding means, an electromagnetic clutch for driving said strip feeding means from said driving means, a first switch under the control of a sheet as it is fed toward said photographic field for energizing said illuminating means while said first switch is under control of said sheet, an electromagnetic relay for energizing said illuminating means independently of control of said first switch by said sheet when the relay coil of said relay is energized, a rectifier having its output connected with said clutch and relay coil, and a second switch under the control of said sheet in following overlapping relation with said control of said first switch as said sheet is fed toward said photographic field and connected in controlling relation with the input of said rectifier for energizing the same from an alternating current source.

4. In a photographic apparatus, the combination of a camera including strip feeding means for feeding a sensitized strip through the exposure field of said camera, sheet feeding means for successively feeding sheets through the photographic field of said camera, electrically energizable illuminating means for illuminating said sheets at said photographic field, driving means for driving said sheet feeding means, an electromagnetic clutch for driving said strip feeding means from said driving means, a normally open first switch connected in series with said illuminating means and under the control of a sheet as it is fed toward said photographic field to be closed while under said control, an electromagnetic relay comprising a normally open relay switch and a relay coil adapted when energized to close said relay switch, said relay switch being connected in series with said illuminating means independently of said first switch, a transformer, a rectifier having its input connected to the secondary of said transformer and having its output connected with said clutch and relay coil, and a third switch under the control of said sheet in following overlapping relation with said control of said first switch as said sheet is fed toward said photographic field and connected in series with the primary of said transformer for energizing the same from an alternating current source.

5. In a photographic apparatus the combination of a camera including strip feeding means for feeding a sensitized strip through the exposure field of said camera, sheet feeding means for successively feeding sheets through the photographic field of said camera for photographing the sheets on the strip, electrically energizable illuminating means for illuminating said sheets at said photographic field, driving means for driving said sheet feeding means, an electromagnetic clutch for driving said strip feeding means from said driving means, an electromagnetic relay comprising a normally open relay switch and a relay coil adapted when energized to close said relay switch and said relay switch being connected in controlling relation with said illuminating means to energize said illuminating means when said relay switch is closed, a normally open switch connected in controlling relation with said clutch and relay coil and under the control of a sheet fed by said sheet feeding means to engage said clutch and energize said illuminating means while under such control, and a single pole double throw switch having its switch arm normally contacting one stationary contact thereof and having said switch arm and said one contact connected in series relation with said relay switch and illuminating means and having its switch arm and the other side contact thereof connected in controlling relation with said clutch and relay coil independently of said sheet controlled switch to engage said clutch and energize said relay coil when said switch arm contacts said other stationary contact.

6. In a photographic apparatus, the combination of a camera including strip feeding means for feeding a sensitized strip through the exposure field of said camera, sheet feeding means for successively feeding sheets through the photographic field of said camera for photographing the sheets on the strip, driving means for driving said sheet feeding means, an electromagnetic clutch for driving said strip feeding means from said driving means, a clutch engaging means comprising a switch connected in controlling relation with said clutch and under the control of a sheet fed by said sheet feeding means to engage said clutch while under said control, a second clutch engaging means for engaging said clutch independently of said switch, an interval timer, means under the control of said timer for maintaining said second clutch engaging means in clutch engaging condition during the timing interval of said timer and terminating said condition at the end of said timing interval, and means for placing said second clutch engaging means in clutch engaging condition and initiating the timing cycle of said timer in concomitant relation and independently of said switch.

7. In a photographic apparatus, the combination of a camera including strip feeding means for feeding a sensitized strip through the exposure field of said camera, sheet feeding means for successively feeding sheets through the photographic field of said camera for photographing the sheets on the strip, driving means for driving said sheet feeding means, an electromagnetic clutch for driving said strip feeding means from said driving means, a switch connected in controlling relation with said clutch and under the control of a sheet fed by said sheet feeding means to engage said clutch while under said control, an electromagnetic relay for engaging said clutch independently of said switch, a second switch connected in controlling relation with said relay for engaging said clutch, an interval timer, means under the control of said timer for maintaining said second switch in clutch engaging position during the timing interval of said timer and terminating said condition at the end of said timing interval, and means for placing said second switch in clutch engaging position and initiating the timing cycle of said timer in concomitant relation and independently of said first mentioned switch.

8. In a photographic apparatus, the combination of a camera including strip feeding means for feeding a sensitized strip through the exposure field of said camera, sheet feeding means for successively feeding sheets through the photographic field of said camera for photographing the sheets on the strip, driving means for driving said sheet feeding means, an electromagnetic clutch for driving said strip feeding means from said driving means, a switch connected in controlling relation with said clutch and under the control of a sheet fed by said sheet feeding means to engage said clutch while under said control, an electromagnetic relay comprising a relay coil and two relay switches under the control of said relay coil and one of said relay switches being connected in controlling relation with said clutch independently of said first mentioned switch and the other of said relay switches being connected in controlling relation with said relay coil, an interval timer, means under the control of said timer for maintaining said relay coil in clutch engaging condition during the timing interval of said timer and terminating said condition at the end of said timing interval in cooperation with said other relay switch, and means for initially placing said relay coil in clutch engaging condition and initiating the timing cycle of said timer in concomitant relation and independently of said first mentioned switch.

9. In a photographic apparatus, the combination of a camera including strip feeding means for feeding a sensitized strip through the exposure field of said camera, sheet feeding means for successively feeding sheets through the photographic field of said camera for photographing the sheets on the strip, driving means for driving said sheet feeding means, an electromagnetic clutch for driving said strip feeding means from said driving means, a switch connected in controlling relation with said clutch and under the control of a sheet fed by said sheet feeding means to engage said clutch while under said control, an electromagnetic relay comprising a relay coil and two relay switches under the control of said relay coil and one of said relay switches being connected in controlling relation with said clutch independently of said first mentioned switch, an interval timer comprising a timer switch under the control of the timing mechanism of said timer, said timer switch and the other of said relay switches being connected in series controlling relation with said relay coil for maintaining said relay coil in clutch engaging condition during the timing interval of said timer and terminating said condition at the end of said timing interval, and means comprising a switch connected in controlling relation with said relay coil for initially placing said relay coil in clutch engaging condition and initiating the timing cycle of said timer in concomitant relation and independently of said mentioned switch.

10. In a photographic apparatus, the combination of a camera including strip feeding means for feeding a sensitized strip through the exposure field of said camera, sheet feeding means for successively feeding sheets through the photographic field of said camera for photographing the sheets on the strip, driving means for driving said sheet feeding means, an electromagnetic clutch for driving said strip feeding means from said driving means, a switch connected in controlling relation with said clutch and under the control of a sheet fed by said sheet feeding means to engage said clutch while under said control, an electromagnetic relay comprising a relay coil and two relay switches under the control of said relay coil and one of said relay switches being connected in controlling relation with said clutch independently of said first mentioned switch, an interval timer comprising an electric timing mechanism motor and a timer switch connected in controlling relation with said motor and normally in motor energizing position and under the control of the timer mechanism to deenergize said motor at the end of the timing interval of said timer, said timer switch and the other of said relay switches being connected in series controlling relation with said timing motor and relay coil for maintaining said motor energized and said relay coil in clutch engaging condition during the timing interval of said timer and deenergizing said motor and terminating said condition at the end of said timing interval, and a switch connected in controlling relation with said timer motor and relay coil for initially placing said relay coil in clutch engaging condition and initiating the timing cycle of said timer in concomitant relation and independently of said first mentioned switch.

11. In a photographic apparatus, the combination of a camera including strip feeding means for feeding a sensitized strip through the exposure field of the camera, sheet feeding means for successively feeding sheets through the photographic field of said camera for photographing the sheets on the strip, driving means for driving said sheet feeding means, an electromagnetic clutch for driving said strip feeding means from said driving means, a switch connected in controlling relation with said clutch and under the control of a sheet fed by said sheet feeding means to engage said clutch while under said control, a first electromagnetic relay comprising a first relay coil and a first relay switch under the control of said relay coil and connected in controlling relation with said clutch independently of said first mentioned switch, a second electromagnetic relay comprising a second relay coil and two second relay switches under the control of said second relay coil and one of said second relay switches being connected in controlling relation with said first relay coil, an interval timer comprising an electric timing mechanism motor and a timer switch connected in controlling relation with said motor and normally in motor energizing position and under the control of the timer mechanism to deenergize said motor at the end of the timing interval of said timer, said timer switch and the other of said second relay switches being connected in series controlling relation with said motor and second relay coil for maintaining said motor energized and said relay coils in clutch engaging condition during the timing interval of said timer and deenergizing said motor and terminating said condition at the end of said timing interval, and a switch connected in controlling relation with said timer motor and second relay coil for initially placing said relay coils in clutch engaging condition and initiating the timing cycle of said timer in concomitant relation and independently of said first mentioned switch.

12. In a photographic apparatus, the combination of claim 6, and further comprising a manually controlled means for engaging said clutch.

13. In a photographic apparatus, the combination of claim 7 and further comprising a manually controlled switch for engaging said clutch.

14. In a photographic apparatus, the combination of claim 10 and further comprising a manually controlled switch connected in controlling relation with said clutch in shunt relation with said one relay switch for engaging said clutch.

15. In a photographic apparatus, the combination of claim 11 and further comprising a manually controlled switch connected in controlling relation with said first relay coil in shunt relation with said one second relay switch for engaging said clutch.

16. In a photographic apparatus, the combination of a camera including strip feeding means for feeding a sensitized strip through the exposure field of said camera, sheet feeding means for successively feeding sheets through the photographic field of said camera for photographing the sheets on the strip, electrically energizable illuminating means for illuminating said sheets at said photographic field, driving means for driving said sheet feeding means, an electromagnetic clutch for driving said strip feeding means from said driving means, a switch connected in controlling relation with said clutch and illuminating means and under the control of a sheet fed by said feeding means for engaging said clutch and energizing said illuminating means while under said control, a second switch connected in controlling relation with said clutch independently of said first mentioned switch and with said illuminating means for engaging said clutch and deenergizing said illuminating means, an interval timer, means under the control of said timer for maintaining said second switch in clutch-engaging and illuminating-means-deenergized position during the timing interval of said timer and placing said second switch in clutch-disengaging and illuminating-means-energized position at the end of said timing interval, and means for placing said second switch in clutch-engaging illuminating-means-deenergized position and initiating the timing cycle of said timer in concomitant relation and independently of said first mentioned switch.

17. In a photographic apparatus, the combination of a camera including strip feeding means for feeding a sensitized strip through the exposure field of said camera, sheet feeding means for successively feeding sheets through the photographic field of said camera for photographing the sheets on the strip, electrically energizable illuminating means for illuminating said sheets at said photographic field, driving means for driving said sheet feeding means, an electromagnetic clutch for driving said strip feeding means from said driving means, a switch connected in controlling relation with said clutch and illuminating means and under the control of a sheet fed by said sheet feeding means to engage said clutch and energize said illuminating means while under said control, an electromagnetic relay comprising a relay coil and a double throw relay switch controlled by said relay coil and having its stationary contacts respectively connected in controlling relation with said clutch independently of said first mentioned switch and with said illuminating means for alternately engaging said clutch and energizing said illuminating means, a third switch connected in controlling relation with said relay coil, an interval timer, means under the control of said timer for maintaining said third switch in clutch-engaging illuminating-means-deenergized position during the timing interval of said timer and placing said third switch in clutch disengaging and illuminating means energized position at the end of said timing interval, and means for placing said third switch in clutch engaging illuminating means deenergized position and initiating the timing cycle of said timer in concomitant relation and independently of said first mentioned switch.

18. In a photographic apparatus, the combination of a camera including strip feeding means for feeding a sensitized strip through the exposure field of said camera, sheet feeding means for successively feeding sheets through the photographic field of said camera for photographing the sheets on the strip, electrically energizable illuminating means for illuminating said sheets at said photographic field, driving means for driving said sheet feeding means, an electromagnetic clutch for driving said strip feeding means from said driving means, a switch connected in controlling relation with said clutch and illuminating means and under the control of a sheet fed by said sheet feeding means to engage said clutch and energize said illuminating means while under said control, a first electromagnetic relay comprising a first relay coil and a double throw first relay switch controlled by said relay coil and having its stationary contacts respectively connected in controlling relation with said clutch independently of said first mentioned switch and with said illuminating means for alternately engaging said clutch and energizing said illuminating means, a second electromagnetic relay comprising a second relay coil and two second relay switches under the control of said second relay coil and one of said second relay switches being connected in controlling relation with said first relay coil, an interval timer comprising an electric timing mechanism motor and a timer switch connected in controlling relation with said motor and normally in motor energizing position and under the control of the timer mechanism to deenergize said motor at the end of the timing interval of said timer, said timer switch and the other of said second relay switches being connected in series controlling relation with said motor and said second relay coil for maintaining said relay coils in clutch-engaging illuminating-means-deenergized condition during the timing interval of said timer and placing said relay coils in clutch disengaging and illuminating means energized condition at the end of said timing interval, and a switch connected in controlling relation with said timer motor and second relay coil for initially placing said relay coils in clutch engaging illuminating means deenergized position and initiating the timing cycle of said timer in concomitant relation and independently of said first mentioned switch.

References Cited in the file of this patent

UNITED STATES PATENTS

| Number | Name | Date |
|---|---|---|
| 1,912,703 | Hopkins | June 6, 1933 |
| 1,938,828 | Gordon | Dec. 12, 1933 |
| 1,966,348 | Hughey | July 10, 1934 |
| 1,976,346 | Hughey | Oct. 9, 1934 |
| 2,251,570 | Hessert | Aug. 5, 1941 |
| 2,260,495 | Tutwiler | Oct. 28, 1941 |
| 2,377,525 | Schutt | June 5, 1945 |
| 2,391,274 | Schubert | Dec. 18, 1945 |
| 2,403,711 | Egan | July 9, 1946 |
| 2,435,099 | Pratt | Jan. 27, 1948 |
| 2,461,185 | Schubert | Feb. 8, 1949 |
| 2,478,641 | Rose | Aug. 9, 1949 |
| 2,480,122 | Daniels | Aug. 30, 1949 |
| 2,481,694 | Schubert | Sept. 13, 1949 |
| 2,492,127 | Hessert | Dec. 20, 1949 |